United States Patent [19]

Kasai

[11] Patent Number: 4,617,704
[45] Date of Patent: Oct. 21, 1986

[54] SWIVEL SNAP HOOK OF SYNTHETIC RESIN
[75] Inventor: Kazumi Kasai, Namerikawa, Japan
[73] Assignee: Nippon Notion Kogyo Co., Ltd., Tokyo, Japan
[21] Appl. No.: 722,476
[22] Filed: Apr. 12, 1985
[30] Foreign Application Priority Data
Apr. 12, 1984 [JP] Japan .............. 59-54032[U]
[51] Int. Cl.[4] ............................................. A44B 13/02
[52] U.S. Cl. ........................................ 24/236; 24/237
[58] Field of Search .......................... 24/236, 237, 537
[56] References Cited

U.S. PATENT DOCUMENTS

| 548,694 | 10/1895 | Breul | 24/237 |
|---|---|---|---|
| 1,059,117 | 4/1913 | Chittenden | 24/236 |
| 1,059,812 | 4/1913 | Barry | 24/236 |
| 1,662,940 | 3/1928 | Sievern | 24/236 |
| 1,744,344 | 1/1930 | Sullivan | 24/236 |
| 1,764,813 | 6/1930 | Thornley | 24/236 |
| 2,198,092 | 4/1940 | Schor et al. | 24/236 |
| 2,595,700 | 5/1952 | Plough | 24/236 |
| 4,064,604 | 12/1977 | Hartman | 24/236 |
| 4,149,369 | 4/1979 | Smetz | 24/236 |

Primary Examiner—Victor N. Sakran
Attorney, Agent, or Firm—Hill, Van Santen, Steadman & Simpson

[57] ABSTRACT

In a swivel snap hook of synthetic resin, a unitary hook member has a hook body and a resiliently deformable closure tongue molded integrally therewith, and a free end of the closure tongue, as the latter is in a free form, is disposed in the general plane of a free end of the hook body with a relatively small gap therebetween. In use, as the closure tongue is depressed inwardly against its resilience by a ring-shaped article to be hooked, the free end of the tongue is spaced away from the free end of the hook body in a direction perpendicular to the general plane of the hook body's free end to open the hook body.

12 Claims, 19 Drawing Figures

FIG. 8
FIG. 9
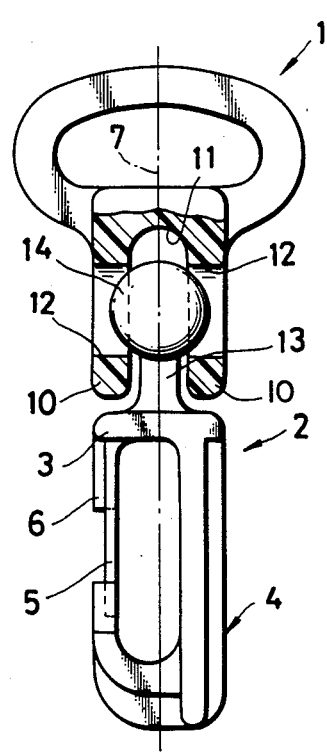
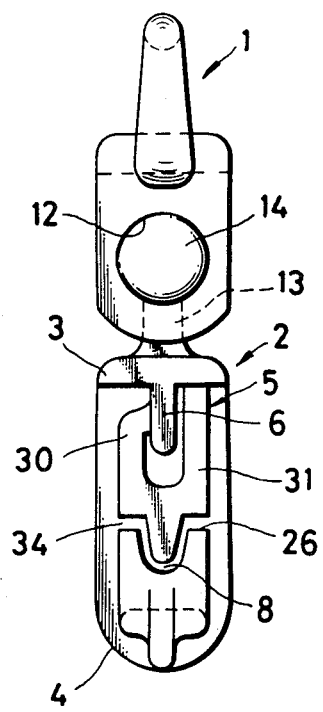

FIG. 14
FIG. 15
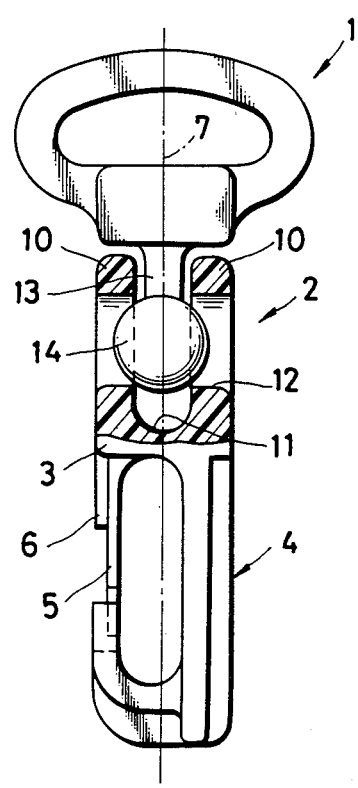
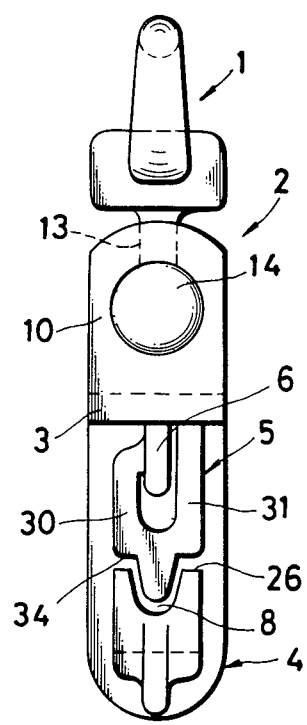

FIG. 16
FIG. 17
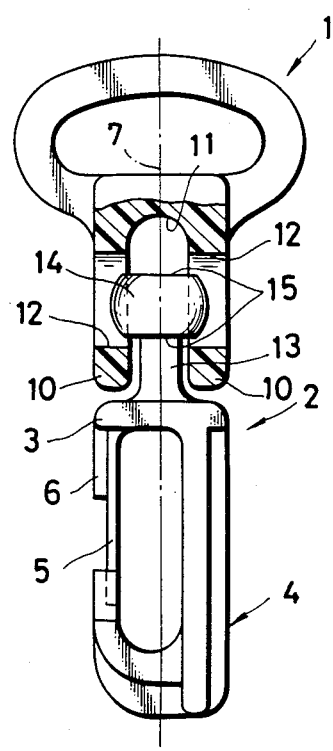
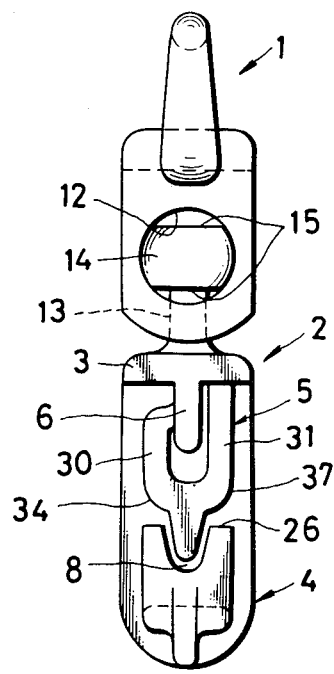

SWIVEL SNAP HOOK OF SYNTHETIC RESIN

BACKGROUND OF THE INVENTION

1. Field of the Invention

The present invention relates to a swivel snap hook of synthetic resin for use on a carrying strap of a bag, for example.

2. Prior Art

There are now on the market various swivel snap hooks of synthetic resin, or metal, for use on a carrying strap of a bag such as a shoulder bag. The prior hooks have a hook body and a separate closure tongue which normally closes the hook body and which is resiliently deformable to open the hook body. However, the known hook is disadvantageous in that the hook body and the closure tongue need to be joined or assembled together after these two parts have been made of independently of each other, causing only a limited rate of production and hence resulting in expensive products.

To this end, a solution has been proposed in which the hook body and the closure tongue are formed of synthetic resin integrally with each other. In production, the hook body and the closure tongue are molded simultaneously on a common mold in such a manner that a free end of the closure tongue is initially disposed outwardly of a free end of the hook body with a relatively small gap therebetween. Then the closure tongue needs to be depressed inwardly of the hook body against the resilience of the closure tongue to bring its free end into engagement with the free end of the hook body on an inner side thereof, which is laborious and time-consuming.

SUMMARY OF THE INVENTION

In a swivel snap hook of synthetic resin according to the present invention, a unitary hook member has a hook body and a resiliently deformable closure tongue molded integrally therewith, and a free end of the closure tongue, as the latter is in a free form, is disposed in the general plane of a free end of the hook body with a relatively small gap therebetween. In use, as the closure tongue is depressed inwardly against its resilience by a ring-shaped article to be hooked, the free end of the tongue is spaced away from the free end of the hook body in a direction perpendicular to the general plane of the hook body's free end to open the hook body.

It is therefore an object of the present invention to provide a swivel snap hook of synthetic resin which can be produced in a reduced number of manufacturing processes, requiring no additional step of bringing a free end of the closure tongue into engagement with a free end of the hook body on an inner side thereof after the hook has been molded.

Many other advantages, features and additional objects of the present invention will become manifest to those versed in the art upon making reference to the detailed description and the accompanying drawings in which certain preferred embodiments incorporating the principles of the present invention are shown by way of illustrative example.

BRIEF DESCRIPTION OF THE DRAWINGS

FIG. 8 is a front elevational view, with parts broken away, of a modified swivel snap hook according to a second embodiment;

FIG. 9 is a side elevational view of FIG. 8;

FIG. 14 is a front elevational view similar to FIG. 8, showing a fifth embodiment;

FIG. 15 is a side elevational view of FIG. 14;

FIG. 16 is a front elevational view similar to FIG. 10, showing a sixth embodiment;

FIG. 17 is a side elevational view of FIG. 16;

DETAILED DESCRIPTION

Figure 1:
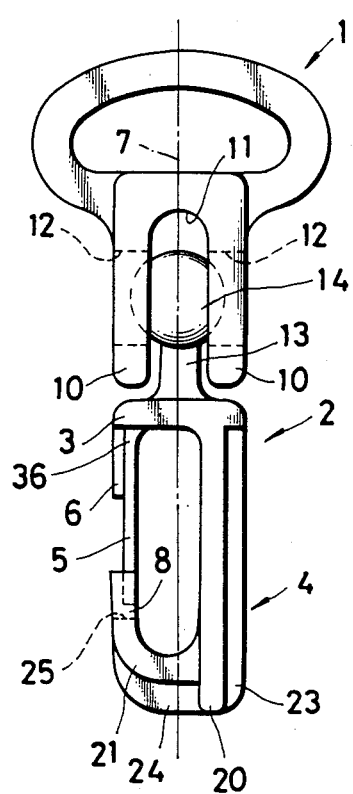
FIG. 1 is a front elevational view of a swivel snap hook of synthetic resin embodying the present invention.

FIGS. 1 through 4 shows a swivel snap hook which comprises an eye member 1 adapted to be attached to one end of a carrying strap (not shown) of a bag such as a shoulder bag, and a hook member 2 rotatably and rockably connected to the eye member 1. The eye and hook members 1, 2 are molded of synthetic resin in a manner described below.

The eye member 1 has an integral bearing portion which extends outwardly and downwardly therefrom and which is divided into a pair of opposed bearing halves 10, 10 by a space 11. The pair of opposed bearing halves 10, 10 have a pair of aligned through-holes 12, 12 of circular cross section communicating with the space 11.

The hook member 2 has a base 3, a hook body 4 extending downwardly from a lower side of the base 3, and a planar closure tongue 5 extending downwardly from the lower side of the base 3 so as to normally close the hook body 4 in a manner described below. The hook member 2 also has an integral arm portion 13 extending upwardly from the base 3 remotely from the hook body 4 and the closure tongue 5 into the space 11 and terminating in an enlarged end 14 loosely received in the through-holes 12, 12 in the bearing halves 10, 10 across the space 11.

The arm portion 13 has a circular cross section of a diameter slightly smaller than the width of the space 11 (FIGS. 1 and 3), while the enlarged end 14 of the arm portion 13 is in the shape of a sphere having a diameter larger than the width of the space 11 and substantially equal to the diameter of the through-holes 12, 12. Thus the hook member 2 is rotatable and rockable on the eye member 1 and vice versa. Specifically, the hook member 2 is rotatable on the eye member 1 about the axis of the arm portion 13 and is pivotally movable on the eye member 1 about the spherical enlarged end 14 in a plane which includes the axis 7 of the bearing portion and which is parallel to the bearing halves 10, 10.

The hook body 4 has a large-width plate-like portion 20 projecting perpendicularly from the base 3, and a smaller-width hook-shaped portion 21 extending substantially perpendicularly from a lower end of the plate-like portion 20 and terminating in an upwardly directed free end. The plate-like portion 20 and the hook-shaped portion 21 have along their respective outer surfaces a pair of reinforcing ribs 23, 24. The hook-shaped portion 21 has centrally in the free end thereof a U-shaped recess 25 so as to have a generally inverted Ω-shaped end surface 26, as shown in FIG. 2.

Figure 2:
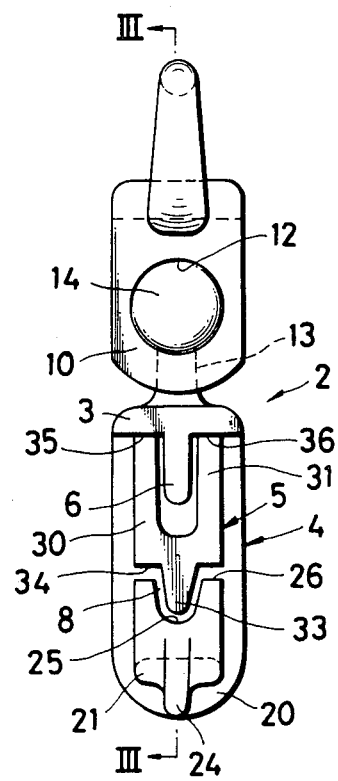
FIG. 2 is a side elevational view of FIG. 1.
Figure 3:
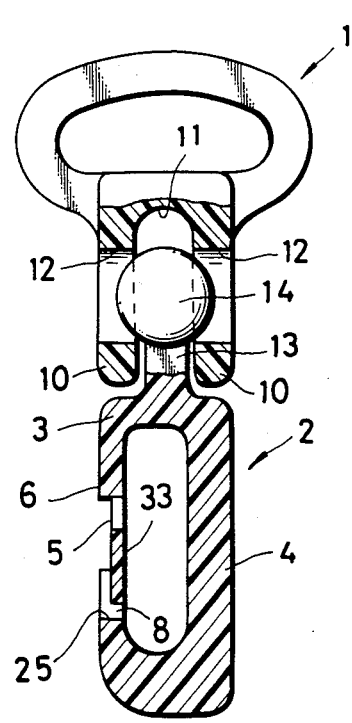
FIG. 3 is a cross-sectional view taken along line III—III of FIG. 2.
Figure 4:
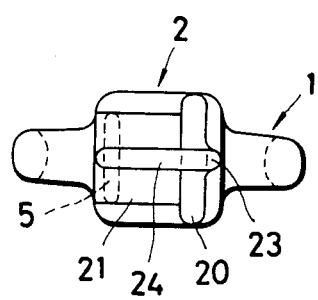
FIG. 4 is a bottom view of FIG. 1.

As shown in FIG. 2, the closure tongue 5 is of a generally Y-shape having a pair of spaced legs 30, 31 integral with the base 3, and a projection 33 extending downwardly from the junction of the two legs 30, 31 into the recess 25 in the free end of the hook-shaped portion 21. Thus a free end of the closure tongue 5 has a surface 34 substantially complementary in contour to the end surface 26 of the hook-shaped portion 21. As shown in FIGS. 1 and 3, the free end of the closure tongue 5, as the latter is in a free form, is disposed in the general plane of the free end of the hook-shaped portion 21 and is spaced apart from the free end of the hook-shaped portion 21 by a relatively small gap 8 of a generally inverted Ω-shape (FIG. 2). In use, as the closure tongue 5 is depressed inwardly against its resilience by a ring-shaped article (not shown) to be hooked, the free end of the closure tongue 5 is deformed to be spaced apart from the free end of the hook-shaped portion 21 in a direction perpendicular to the general plane of the free end of the hook-shaped portion 21 to open the hook body 4 so that the article is allowed to be threaded onto the hook body 4. Upon the release of depressing force, the closure tongue 5 restores the shape of FIGS. 1 and 3 under its resilience to close the hook body 4, thus preventing the article from being removed from the hook body 4.

An auxiliary tongue 6 extends from the base 3 into the space between the two legs 30, 31 of the closure tongue 5. The auxiliary tongue 6 has a thickness larger than the thickness of the closure tongue 5 and serves to restrict lateral deformation of the closure tongue 5, thus preventing the latter from being broken due to undue lateral stress exerted on the closure tongue 5.

Figure 5:
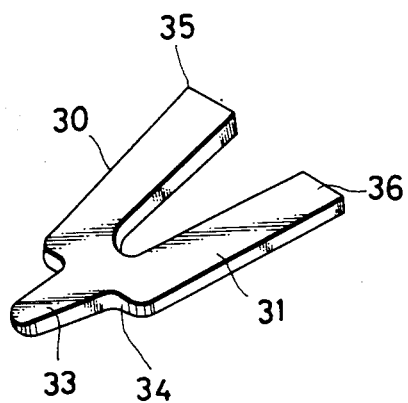
FIG. 5 is a fragmentary enlarged perspective view of a modified closure tongue.

In the embodiment of FIGS. 1-4, the two legs 30, 31 of the closure tongue 5 lie in a common plane so that their respective foot portions 35, 36 are disposed in lateral alignment with each other. Alternatively, the two legs 30, 31 of the closure tongue 5 may be slightly twisted so that their respective foot portions 35, 36 are disposed in a staggered manner in the facewise direction, as shown in FIG. 5. In this twisted form, it is possible to reduce the thickness of the closure tongue 5 without the risk of impairing its resilience.

Figure 6:
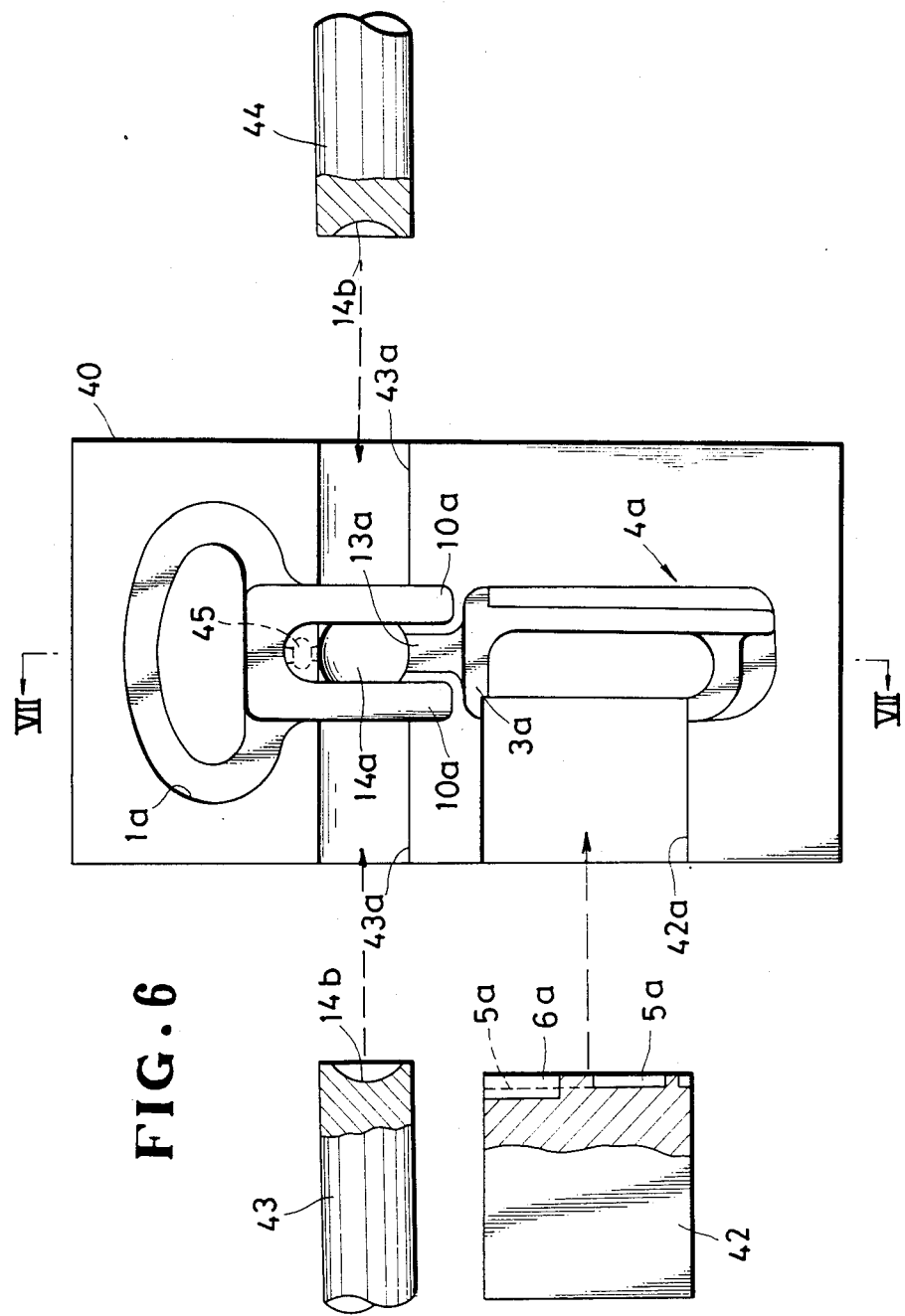
FIG. 6 is an exploded view, with parts broken away, of a mold for molding the hook of FIGS. 1–4.
Figure 7:
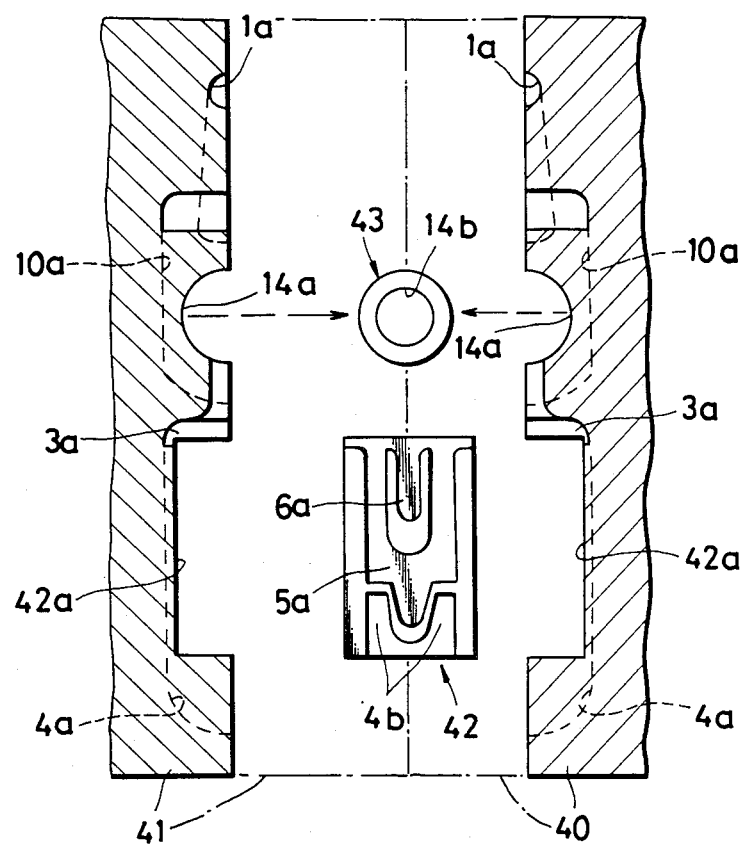
FIG. 7 is a fragmentary cross-sectional view taken along line VII—VII of FIG. 6.

In production, the eye member 1 and the hook member 2 are molded simultaneously in a single molding step in coupled or assembled state. As shown in FIGS. 6 and 7, the mold includes a pair of identical molding die halves 40, 41, an associated block 42, and a pair of identical associated slides of rods 43, 44. The two molding die halves 40, 41, the block 42 and the two cylindrical rods 43, 44, when the mold is closed, jointly define a mold cavity having a contour corresponding to the shape of the eye and hook members 1, 2 in coupled state.

The two molding die halves 40, 41 have a pair of symmetrical first recesses 1a, 1a for forming the eye member 1 of a prospective swivel snap hook, a pair of symmetrical second recesses 10a, 10a for forming the bearing portion, a pair of symmetrical third recesses 3a, 3a for forming the base 3 of the hook member 2, a pair of symmetrical fourth recesses 4a, 4a for forming the hook body 4, and a pair of symmetrical fifth recesses 13a, 13a for forming the arm portion 13. The molding die halves 40 41 have also a pair of symmetrical sixth recesses 14a, 14a for forming a central part of the spherical enlarged end 14 which part is in the shape of a remainder of a sphere in which a pair of diametrically opposed segmental parts has been cut off by a pair of parallel planes. For forming each of the remaining (segmental) parts of the spherical enlarged end 14, each cylindrical rod 43, 44 has in its one end an seventh recess 14b.

Further, the two molding die halves 40, 41 have two pairs of eighth recesses 43a, 43a; 43a, 43a, each having a semi-cylindrical contour. Two of the semi-cylindrical eighth recesses 43a, 43a in one molding die half 40, 41 are longitudinally aligned with each other and are disposed in mirror image relation to the other two semi-cylindrical eighth recesses 43a, 43a, respectively, in the other molding die half 41, 40 when the mold is closed for molding. Each symmetrical pair of the semi-cylindrical eighth recesses 43a, 43a lies perpendicularly to the second recesses 10a and jointly serves to receive a respective one of the cylindrical rods 43, 44.

Additionally, the two molding die halves 40, 41 have a pair of symmetrical ninth recesses 42a, 42a jointly receptive of the associated block 42. The block 42 has in its inner surface a tenth recess 4b for forming the free end of the hook-shaped portion 21, an eleventh recess 5a for forming the closure tongue 5, and a twelfth recess 6a for forming the auxiliary tongue 6.

In molding, the mold is closed, that is, the two molding die halves 40, 41 are put together in such a manner that each of the first, second, third, fourth, fifth, sixth, eighth and ninth recesses 1a, 10a, 3a, 4a, 13a, 14a, 43a, 42a in one molding die half 40, 41 is in registry with a respective one of the corresponding recesses in the other molding die half 41, 40. Each cylindrical rod 43, 44 is inserted through a corresponding one pair of the opposed semi-cylindrical eighth recesses 43a, 43a until the recessed or inner end of the cylindrical rod 43, 44 reaches the sixth recesses 14a, 14a, the block 42 being inserted through the pair of ninth recesses 42a, 42a. An amount of heat-softened thermoplastic synthetic resin is injected through a sprue 45 into the closed mold to fill the mold cavity thereof. After the thermoplastic material filled in the mold cavity has cooled to become hard, the molded article (a prospective swivel snap hook) is removed from the mold by parting the molding die halves 40, 41, the associated block 42 and the two associated cylindrical rods 43, 44 as is well known in the art. As a result, the eye member 1 and the hook member 2 have been simultaneously molded in coupled or assembled state, at which time a free end of the closure tongue 5 lies in the general plane of a free end of the hook-shaped portion 21 and is spaced apart from the free end of the hook-shaped portion 21 with a generally inverted Ω-shaped gap 8.

In use, as the closure tongue 5 is depressed inwardly against its resilience by a ring-shaped article (not shown) to be hooked, the free end of the tongue 5 is deformed to be spaced apart from the free end of the hook-shaped portion 21 to open the hook body 4 so that the article is allowed to be threaded onto the hook body 4. Upon the release of the depressing force, the closure tongue 5 restores the shape of FIGS. 1 and 3 under its resilience to close the hook body 4, thus preventing the threaded article from being removed from the hook body 4. Also, the hook member 2 is rotatable on the eye member 1 about the axis of the arm portion 13 and is pivotally movable on the eye member 1 about the spherical enlarged end 14 in a plane which includes the axis 7 of the bearing portion and which is parallel to the bearing halves 10, 10. With this arrangement, it is possible to mold the eye and hook members 1, 2 concurrently in only one molding step in coupled or assembled state, requiring no additional step of bringing a free end of the closure tongue 5 into engagement with a free end of the hook body 4 on an inner side thereof after the hook has been molded. The overall process for manufacturing this swivel snap hook is quite simplified and hence much less costly.

FIGS. 8 and 9 illustrate a swivel snap hook according to a second embodiment, in which one of the legs 31 of the closure tongue 5 is substantially straight and extends from the base 3, while the other leg 30 is of a generally inverted L-shape and extends from one side of the auxiliary tongue 6. Because of the L-shaped leg 30, which is shorter than the straight leg 31, the closure tongue 5 has an improved degree of resilience.

Figure 10:
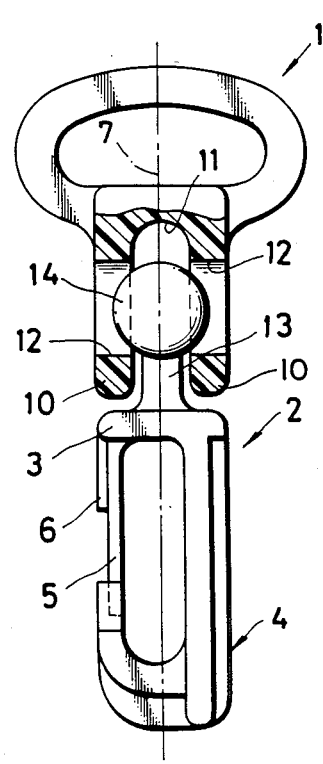
FIG. 10 is a front elevational view similar to FIG. 8, showing a third embodiment.
Figure 11:
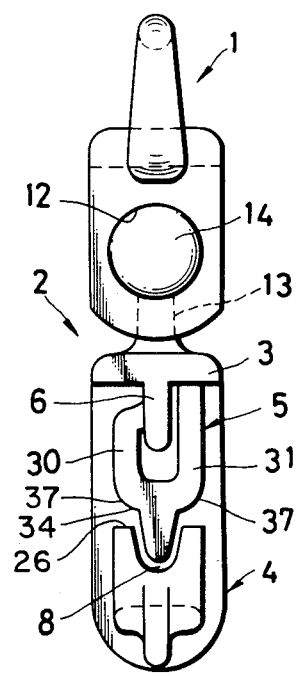
FIG. 11 is a side elevational view of FIG. 10.

FIGS. 10 and 11 illustrate a third embodiment similar to the second embodiment of FIGS. 8 and 9, except that the closure tongue 5 has a pair of rounded corners or shoulders 37, 37. This swivel snap hook causes the same advantageous results as the second embodiment of FIGS. 8 and 9.

Figure 12:
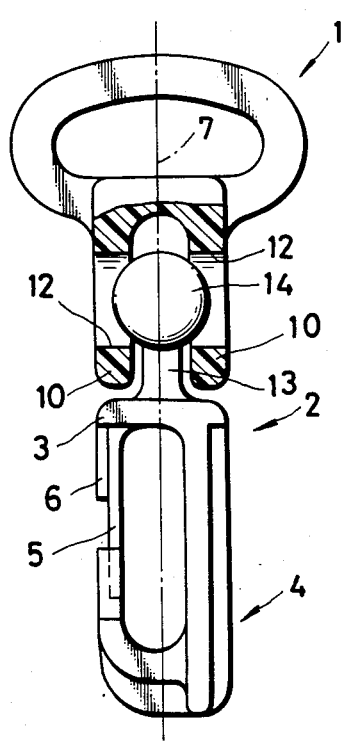
FIG. 12 is a front elevational view similar to FIGS. 8 and 10, showing a fourth embodiment.
Figure 13:
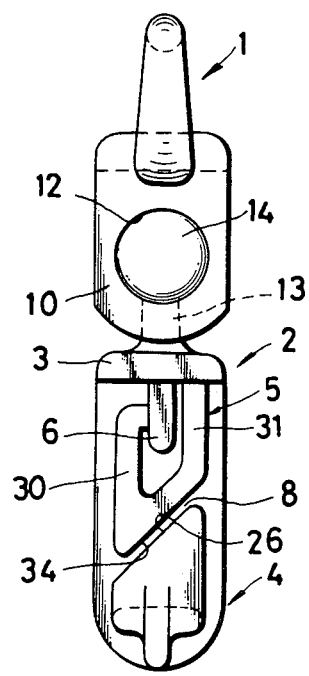
FIG. 13 is a side elevational view of FIG. 12.

According to a fourth embodiment of FIGS. 12 and 13, the confronting end surfaces 26, 34 of the hook body 4 and the closure tongue 5 are substantially straight and are slanted so as to define therebetween an obliquely extending straight gap 8. The same advantageous results as the second embodiment of FIGS. 8 and 9 and the third embodiment of FIGS. 10 and 11 can be achieved with this arrangement.

FIGS. 14 and 15 illustrate a fifth embodiment similar to the second embodiment of FIGS. 8 and 9, except that the bearing halves 10, 10 are an integral part of the hook member 2 and project from the upper side of the base 3 remotely from the hook body 4 and the closure tongue 5, while the arm portion 13 and thus the spherical enlarged end 14 are an integral part of the eye member 1. In this embodiment, the hook member 2 is rotatable on the spherical enlarged end 14 about the axis 7 of the arm portion 13 and is pivotally movable about the spherical enlarged end 14, thus providing a universal joint between the eye and hook members 1, 2, like the first embodiment of FIGS. 1-4 and the second embodiment of FIGS. 8 and 9.

FIGS. 16 and 17 illustrate a sixth embodiment similar to the third embodiment of FIGS. 10 and 11, except that the enlarged end 14 of the arm portion 13 is in the shape of a remainder of a sphere in which a pair of diametrically opposed segmental parts has been cut off by a pair of parallel planes perpendicular to the axis of the arm portion 13. Thus the enlarged end 14 has upper and lower flat surfaces 15, 15. The eye and hook members 1, 2 are rockable with respect to each other, like the embodiments of FIGS. 1-4 and 8-13.

Figure 18:
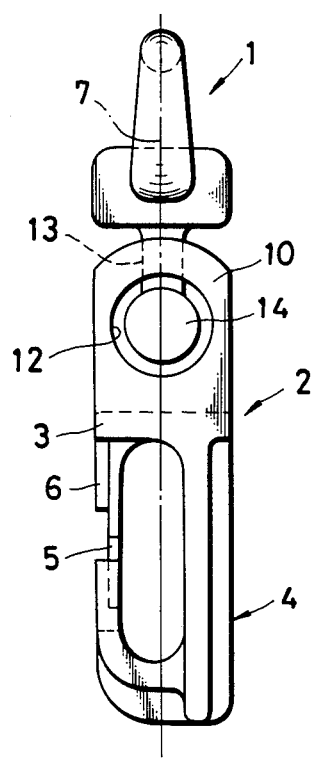
FIG. 18 is a front elevational view similar to FIG. 12, showing a seventh embodiment.
Figure 19:
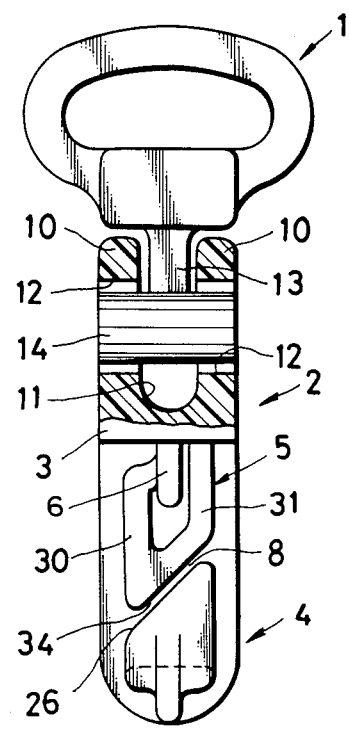
FIG. 19 is a side elevational view of FIG. 18.

FIGS. 18 and 19 illustrate a seventh embodiment similar to the fourth embodiment of FIGS. 12 and 13, except that the bearing halves 10, 10 are an integral part of the hook member 2, while the enlarged end 14 of the arm portion 13 is an integral part of the eye member 1 and is in the shape of a cylinder extending through the pair of aligned through-holes 12, 12 in the bearing halves 10, 10 across the space 11. As the cylindrical enlarged end 14 is rotatably received in the through-holes 12, 12, the hook member 2 is pivotally movable on the eye member 1 about the cylindrical enlarged end 14 in a plane which includes the axis 7 of the arm portion 13 and which is parallel to the bearing halves 10, 10.

Although various minor modifications may be suggested by those versed in the art, it should be understood that I wish to embody within the scope of the patent warranted hereon, all such embodiments as reasonably and properly come within the scope of my contribution to the art.

What is claimed is:

1. A swivel snap hook of synthetic resin, comprising:
   (a) an eye member; and
   (b) a unitary hook member pivotally connected to said eye member, said hook member having a base, a hook body extending from one side of said base, and a planar closure tongue extending freely from said one side of said base so as to normally substantially close said hook body, said closure tongue being resiliently deformable to open said hook body, said closure tongue lying in the general plane of a free end portion of said hook body and having a first end surface which, as said closure tongue is in a free form, faces a second end surface of said hook body in a non-engaging closely spaced relation.

2. A swivel snap hook according to claim 1, said first tongue-end surface and said second hook-body and surface being substantially complementary in contour to each other.

3. A swivel snap hook according to claim 2, said first and second surfaces being substantially straight and being slanted so as to define therebetween an obliquely extending straight gap spanning the widths of said tongue and of said free end portion.

4. A swivel snap hook according to claim 2, said second end surface including a central recess, and said first end surface including a projection extending into said recess so as to define a generally inverted Ω-shaped gap between said first and second end surfaces.

5. A swivel snap hook of synthetic resin, comprising:
   (a) an eye member; and
   (b) a unitary hook member pivotally connected to said eye member, said hook member having a base, a hook body extending from one side of said base, and a planar closure tongue extending from said one side of said base so as to normally substantially close said hook body, said closure tongue having a pair of spaced legs, said hook member having an auxiliary tongue extending from said base into the space between said pair of legs, said auxiliary tongue having a thickness larger than the thickness of said closure tongue, said closure tongue being resiliently deformable to open said hook body, said closure tongue lying in the general plane of a free end portion of said hook body and having a first end surface which, as said closure tongue is in a free form, faces a second end surface of said hook body in a closely spaced relation.

6. A swivel snap hook according to claim 5, said legs of said closure tongue extending substantially perpendicularly to said base and terminating in a junction having a pair of shoulders.

7. A swivel snap hook according to claim 6, each of said shoulders being rounded.

8. A swivel snap hook according to claim 6, said legs of said closure tongue being disposed in a common plane so that their foot portions are disposed in lateral alignment with each other.

9. A swivel snap hook according to claim 6, said legs of said closure tongue being slightly swisted so that their respective foot portions are disposed in a staggered manner in the facewise direction.

10. A swivel snap hook according to claim 5, one of said legs being substantially straight and extending from said base, the other leg being of a generally inverted L shape extending from one side of said auxiliary tongue.

11. A swivel snap hook of synthetic resin, comprising:
 (a) an eye member; and
 (b) a unitary hook member pivotally connected to said eye member, said hook member having a base, a hook body extending from one side of said base remotely from said eye member, and a planar closure tongue extending from said one side of said base remotely from said eye member so as to normally substantially close said hook body, said closure tongue normally lying in the general plane of a free end portion of said hook body and having a first end surface which as said closure tongue is in a free form, faces a second end surface of said free end portion of said hook body in a closely spaced relation, said free end portion of said hook body having a thickness larger than the thickness of said closure tongue, said closure tongue being resiliently deformable in such a manner that a free end portion of said hook body is spaced from said free end portion of said hook body inwardly and outwardly thereof in a direction perpendicular to the general plane of said free end portion of said hook body to open said hook body.

12. A swivel snap hook of synthetic resin according to claim 11, said closure tongue having a free end portion which, as said closure tongue is in a free form, overlaps said free end portion of said hook body as viewed in side elevation.

* * * * *